(12) United States Patent
Bikhleyzer (10) Patent No.: US 7,659,480 B2
(45) Date of Patent: Feb. 9, 2010

(54) VEHICLE GROMMET

(75) Inventor: Aleksandr Bikhleyzer, Ann Arbor, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 300 days.

(21) Appl. No.: 11/776,399

(22) Filed: Jul. 11, 2007

(65) Prior Publication Data

US 2009/0014203 A1  Jan. 15, 2009

(51) Int. Cl.
*H02G 3/18* (2006.01)
(52) U.S. Cl. .................................. 174/153 G
(58) Field of Classification Search ............. 174/153 R, 174/153 G, 151, 152 G, 650, 68.1, 68.3, 135; 16/2.2, 2.3; 439/274, 275, 607, 604; 248/56
See application file for complete search history.

(56) References Cited

U.S. PATENT DOCUMENTS 2,909,198 A  10/1959  Kramer et al.
4,966,202 A  10/1990  Bryan et al.
6,303,869 B1  10/2001  Shanahan et al.
6,844,497 B2 *  1/2005  Frantz et al. ............. 174/72 A
7,053,311 B2 *  5/2006  Santanda ................. 174/154

FOREIGN PATENT DOCUMENTS

FR       2839587           11/2003
WO    WO-2006/114150    11/2006

* cited by examiner

*Primary Examiner*—Dhiru R Patel
(74) *Attorney, Agent, or Firm*—Global IP Counselors, LLP (57) ABSTRACT

A grommet is attached between a body panel and a trunk lid at a location spaced from a hinge structure that movably supports the trunk lid. The grommet forms a wiring passageway between an opening in the body panel and an opening in the trunk lid. The grommet includes a body mounting end, a closure panel mounting end, a first flexible section, a second flexible section and a middle flexible section. The first flexible section extends from the body mounting end and the second flexible section extends from the closure panel mounting end. The middle flexible section extends between the first and second flexible sections in a free floating configuration with respect to the hinge structure, with the first and second flexible sections having a more bendable configuration than the middle flexible section.

37 Claims, 10 Drawing Sheets

VEHICLE GROMMET

BACKGROUND OF THE INVENTION

1. Field of the Invention

The present invention generally relates to a vehicle grommet. More specifically, the present invention relates to vehicle grommet that has a flexible design that allows the grommet to move between an elongated orientation and a coiled orientation.

2. Background Information

Many vehicles have closure panels that include electrically powered fixtures. Vehicle doors are one example of a closure panel that can include such electrically powered accessories such as electric door locks, electric side rear view mirror, etc. A vehicle trunk lid is another example of the closure panel that can include electrically powered accessories such as tail lights, stop lights and/or license plate lights. It is therefore necessary to install insulated electrical conducting wires between the vehicle body and the closure panel. Typically, a hole is formed in a portion of the vehicle body panel, another hole is formed in the closure panel. Wires extend through both holes to provide electric power from the vehicle body to the accessories on or in the closure panel.

The wires that extend between the vehicle body and closure panel are typically protected by a flexible conduit or hollow tube-shaped grommet. More specifically, the grommet has mounting ends that extend into the respective holes in the vehicle body and the closure panel. The wires extend through the grommet. The grommet is shaped and dimensioned such that the wires are prevented from contacting edges of the holes in the vehicle body and the closure panel. Therefore, the insulation on the wires is protected and electrical shorting to metallic portions of the vehicle body is prevented.

A trunk lid of a vehicle is typically supported by hinges such that the trunk lid can move between a closed position and an open position. The hinges are typically installed at opposite lateral sides of the trunk space. In applications where a grommet is installed between the vehicle body and the trunk lid, the grommet must be able to extend to an extended or elongated orientation with the trunk lid in an open position and collapse to a compressed orientation in the closed position. Currently a mid-portion of the grommet is supported by a bracket attached to one of the trunk lid hinges. The bracket serves to keep the grommet from being pinched or crushed by the hinge as the trunk lid closes. As the trunk lid opens, a mid-portion of the grommet moves with one of the trunk lid hinges. As the trunk lid closes, the mid-portion of the grommet is pulled downward to a specific location that is dependent upon the movement of the hinge and the trunk lid. During the movement of the trunk lid, the bracket attached to the hinge, keeps the grommet spaced apart from the hinge.

Using a grommet having a mid-portion that requires attachment to a trunk lid hinge has at least two dis-advantages. First, additional installation steps are required to install the bracket on the hinge and to the mid-portion of the grommet. Second, the bracket itself is an extra part required for installation of the grommet.

In view of the above, it will be apparent to those skilled in the art from this disclosure that there exists a need for an improved grommet that includes fewer attachment parts and yet will collapse into a small overall space while protecting wires extending therethough. This invention addresses this need in the art as well as other needs, which will become apparent to those skilled in the art from this disclosure.

SUMMARY OF THE INVENTION

In accordance with one aspect of the invention, a vehicle grommet assembly includes a body panel having a first opening, a closure panel having a second opening a hinge structure and a wiring grommet member. The hinge structure pivotally couples the body panel to the closure panel for movement of the closure panel between a closed position and an open position. The wiring grommet member is attached between the body panel and the closure panel at a location spaced from the hinge structure and forming a wiring passageway between the first and second openings. The grommet member includes a body mounting end, a closure panel mounting end, a first flexible section, a second flexible section and a middle flexible section. The body mounting end is attached to the body panel to overlie the first opening. The closure panel mounting end is attached to the body panel to overlie the second opening. The first flexible section extends from the body mounting end and the second flexible section extends from the closure panel mounting end. The middle flexible section extends between the first and second flexible sections in a free floating configuration with respect to the hinge structure. Further, the first and second flexible sections having a more bendable configuration than the middle flexible section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
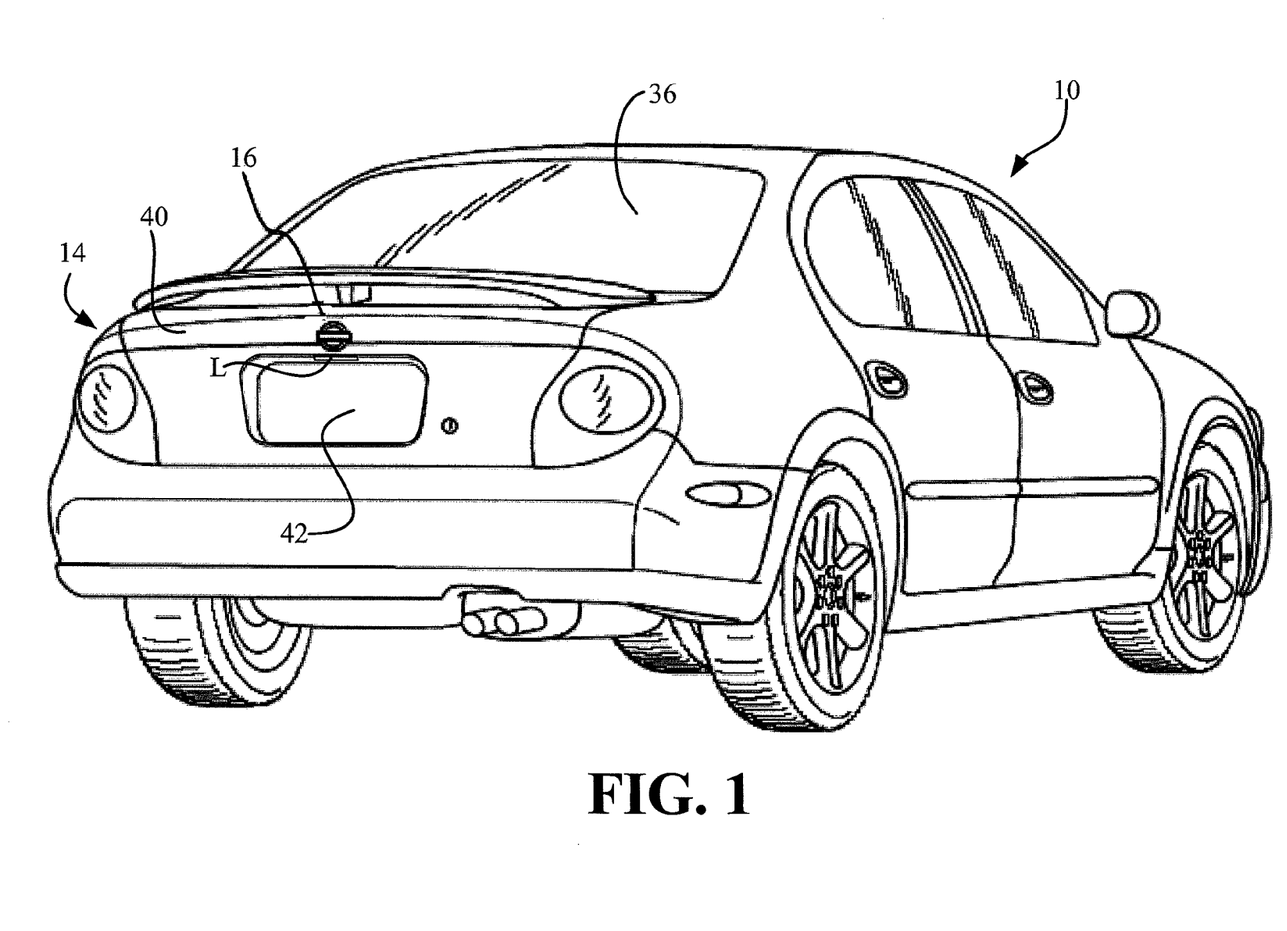
FIG. 1 is a rear perspective view of a vehicle showing a vehicle body that includes a outer side body panel and a trunk lid with the trunk lid in a closed position concealing a vehicle trunk in accordance with the present invention.
Figure 2:
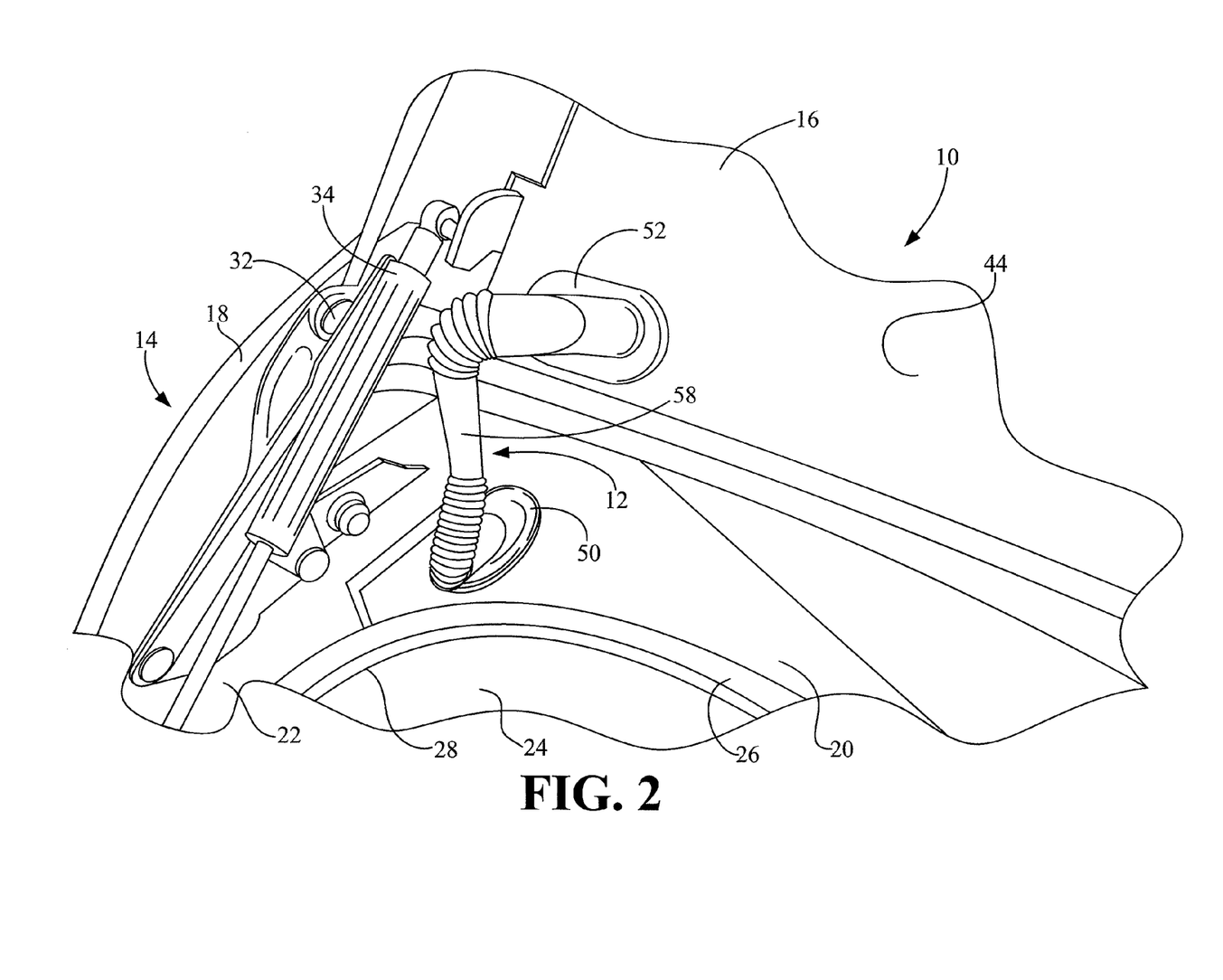
FIG. 2 is another rear perspective view of the vehicle showing the trunk lid in an open position revealing a grommet, with the grommet in an extended or elongated orientation extending between the vehicle body and the trunk lid in accordance with a first embodiment of the present invention.

Referring initially to FIG. 1, a vehicle 10 is illustrated in accordance with a first embodiment of the present invention. As shown in FIG. 2, the vehicle 10 includes a grommet 12 that is installed between a vehicle body 14 and a movable trunk lid 16. The grommet 12 is designed to flex between an elongated orientation (FIGS. 2, 11 and 14) and a coiled orientation (FIGS. 9 and 12) as the trunk lid 16 moves between an open position (FIGS. 2, 11 and 14) and a closed position (FIGS. 1, 9 and 12), as described in greater detail below.

As best shown in FIG. 2, the vehicle body 14 of the vehicle 10 includes an outer side body panel 18, a rear window support portion 20, an inner side body panel 22, a trunk wall 24, a trunk seal 26 and a trunk opening 28.

The outer side body panel 18, the rear window support portion 20 and the inner side body panel 22 are part of a body panel assembly of the vehicle body 14 that at least partially defines the trunk opening 28. Two conventional hinges 32 are mounted between the inner side body panel 22 and a portion of the trunk lid 16. It should be understood from the drawings and the description herein that there are two hinges 32, one on each side of the trunk lid 16. However, only one hinge 32 is shown in FIG. 2. For the sake of brevity, only one hinge 32 is described herein.

Figure 3:
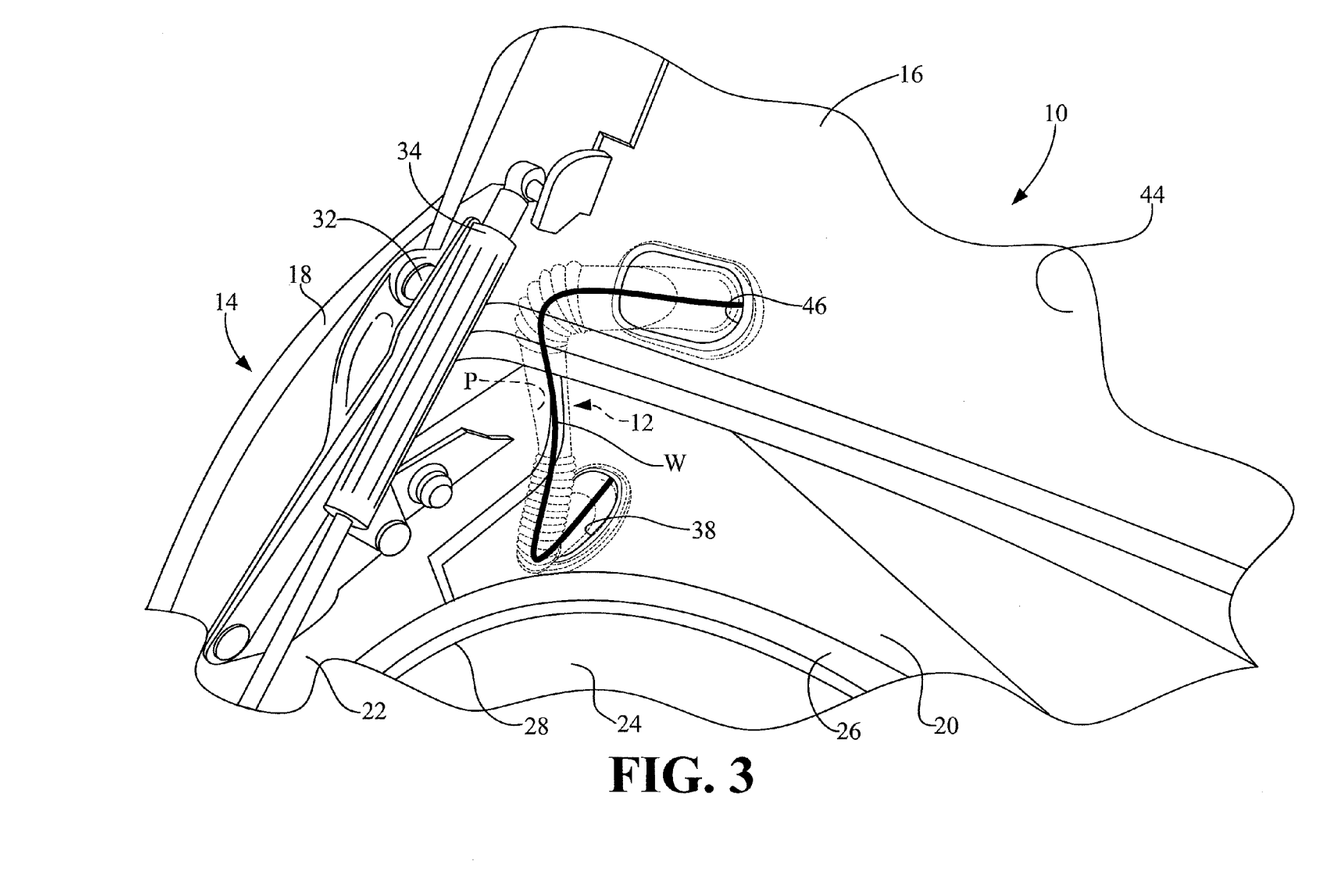
FIG. 3 is another rear perspective view of the vehicle similar to FIG. 2, showing the trunk lid in an open position but with the grommet depicted in phantom to reveal a first opening in a rear window support portion of the vehicle body and a second opening in the trunk lid in accordance with the first embodiment of the present invention.
Figure 4:
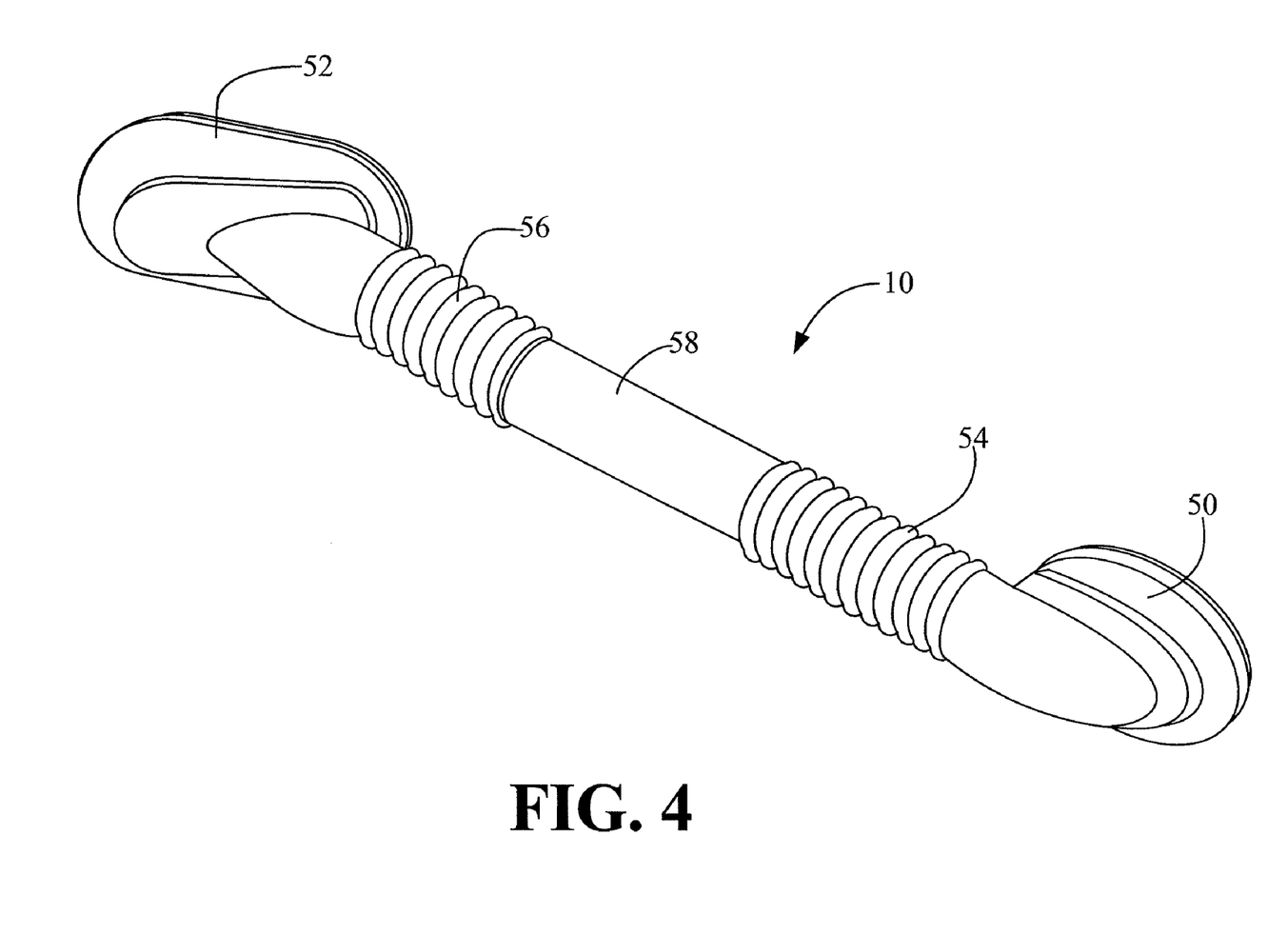
FIG. 4 is a perspective view of the grommet showing a body mounting end, a closure panel mounting end, a first flexible portion, a second flexible portion and a middle flexible portion in accordance with the first embodiment of the present invention.

Adjacent to the hinge 32 is a conventional pneumatic cylinder 34 that biases the trunk lid 16 toward the open position, as shown in FIGS. 2 and 3. The pneumatic cylinder 34 is also mounted between the inner side body panel 22 and a portion of the trunk lid 16. A rear window 36 (shown in FIG. 1) is supported on the rear window support portion 20 in a conventional manner. The trunk seal 26 is a conventional sealing member installed on the rear window support portion 20 and the inner side body panel 22 in a conventional manner. The trunk seal 26 provides a seal between the trunk lid 16 and the vehicle body 14 with the trunk lid 16 in the closed position. The trunk seal 26 can partially or completely surround or encircle the trunk opening 28, depending on the overall design of the trunk of the vehicle 10.

As shown in FIG. 3, the rear window support portion 20 includes a first opening 38. The first opening 38 in the rear window support portion 20 is provided in order to allow passage of wires W that extend out of the vehicle body and into the trunk lid 16. It should be understood from the drawings and description herein that the first opening 38 and wires W are conventional parts of the vehicle 10. For example, the wires W can be included in the vehicle 10 to provide electric power a rear license plate light L (see FIG. 1), an optional electric truck lid lock (not shown) or an optional interior trunk light (not shown) provided on an interior surface of the trunk lid 16. Since such wires W are conventional elements, further description of the wires W is omitted for the sake of brevity.

It should also be understood from the drawings and the description herein that the first opening 38 can be provided at any of a variety of locations on either the rear window support portion 20 or the inner side body panel 22 so long as the first opening 38 is spaced apart from the hinge 32.

The outer side body panel 18, the rear window support portion 20 and the inner side body panel 22, the trunk seal 26, the hinge 32, the pneumatic cylinder 34 and the rear window 36 are all conventional vehicle elements or vehicle body portions. Therefore, further description of these elements and vehicle body portions is omitted for the sake of brevity.

As indicated in FIGS. 1 and 2, the trunk lid 16 is a closure panel that is movable between the open position (FIGS. 2, 3, 11 and 14) and the closed position (FIGS. 1, 9 and 12) to conceal the trunk opening 28 and the trunk itself. The truck lid 16 is also a conventional vehicle body member that includes an outer surface 40 (FIG. 1) that has a license plate retaining portion 42, the license plate light L, and an inner surface 44 (FIG. 2) that can include the optional electric truck lid lock (not shown) and the optional interior trunk light (not shown). Optionally, the outer surface 40 of the trunk lid 16 can also include a turn signal lamp (not shown), a stop lamp (not shown) or other electrically powered elements that can require electric power.

The hinge 32 is attached to the inner surface 44 of the trunk lid 16, as shown in FIGS. 2 and 3. The hinge 32, the trunk lid 16 and the inner side body panel 22 basically define a hinge structure for the vehicle 10. The hinge structure pivotally couples the inner side panel 22 to the trunk lid 16 (the closure panel) for movement of the trunk lid 16 between the closed position and the open position.

The inner surface 44 of the trunk lid 16 also includes a second opening 46 shown in FIG. 3. It should be noted that the grommet 12 is shown in phantom in FIG. 3 in order to reveal the first opening 38 and the second opening 46 and the wiring W extending through a passageway P of the grommet 12. The wires W extend between the vehicle body 14 to the trunk lid 16 by extending out of the first opening 38 and into the second opening 46 of the trunk lid 16. The edges of the first and second openings 38 and 46 can damage the wires W with the trunk lid 16 repeatedly moving back and forth between the closed position and the open position. However, since the wiring W extends through the passageway P of the grommet 12, the grommet 12 prevents the wires W from contacting the edges of the first and second openings 38 and 46 thereby preventing such damage.

With initial reference to FIGS. 5-8, a description of the grommet 12 is now provided. The grommet 12 is a wiring grommet member that serves as a conduit for the wires W. The grommet 12 is attached to the vehicle 10 between the inner side body panel 22 (the body panel) and the trunk lid 16 (the closure panel) at a location spaced from the hinge 32 (the hinge structure) forming a wiring passageway between the first and second openings 38 and 46. However, it should be understood from the drawings and the description herein that the grommet 12 can be used with other closure panels of a vehicle where the closure panel is, for example, a door, engine hood or storage compartment door of the vehicle.

Figure 8:
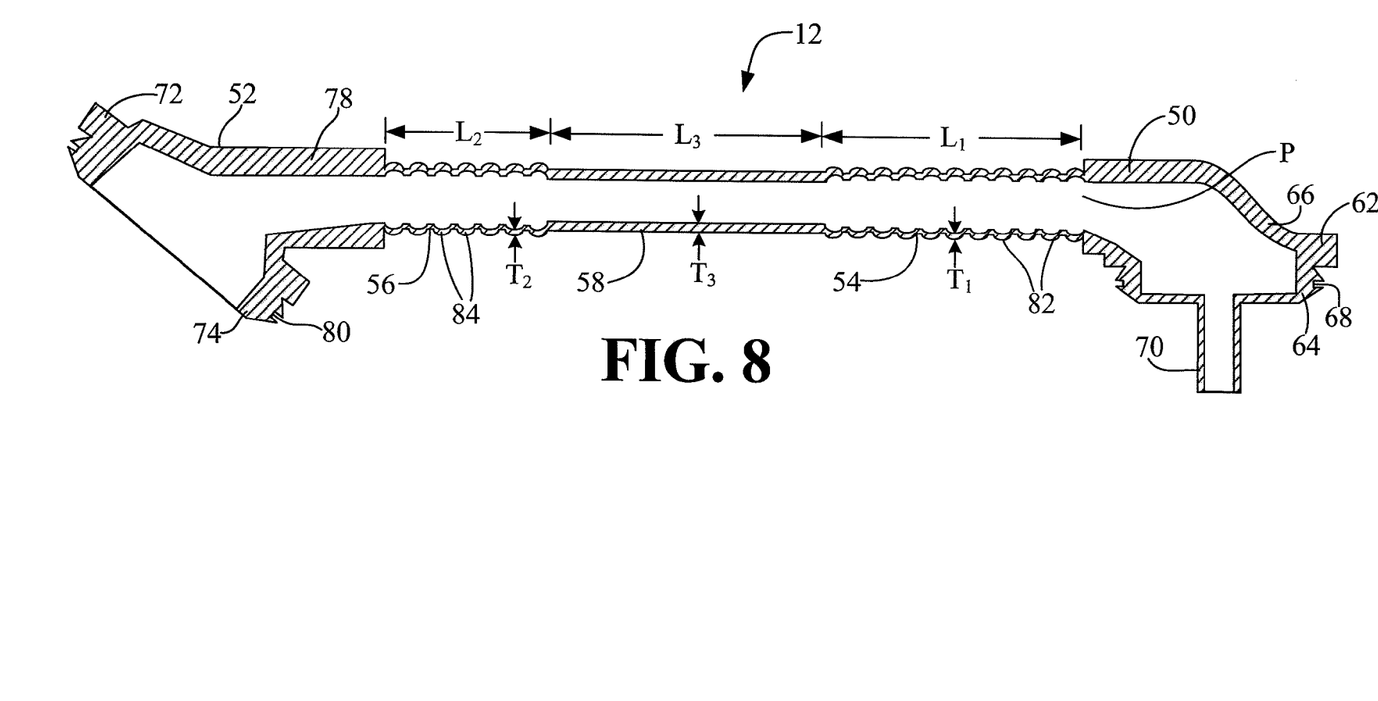
FIG. 8 is cross-sectional view of the grommet taken along the line 8-8 in FIG. 8 showing examples of thicknesses of various portions of the grommet in accordance with the first embodiment of the present invention.

The grommet 12 basically includes a body mounting end 50, a closure panel mounting end 52, a first flexible section 54, a second flexible section 56 and a middle flexible section 58. The grommet 12 further includes a hollow interior that defines the passageway P, as best shown in FIG. 8. The passageway P serves as a conduit for the wiring W. The first flexible section 54, the second flexible section 56 and the middle flexible section 58 are each configurable for tuned bending. More specifically, the first flexible section 54, the second flexible section 56 and the middle flexible section 58 can each be tuned or configured to provide the grommet 12 with a bending configuration that allows for opening and closing of the trunk lid 16 without interference with the grommet 12, as described in greater detail below.

Preferably, the body mounting end 50, the closure panel mounting end 52, the first flexible section 54, the second flexible section 56 and the middle flexible section 58 are all made as a single unitary homogeneous member. For example, the grommet 12 can be molded as a single watertight unitary member. However, it should be understood from the drawings and the description herein that the grommet 12 can also be made of separate portions fastened, glued or otherwise adhered to one another in a water tight manner. More specifically, the grommet 12 is preferably made as a water tight conduit through which wires W can extend and be protected from rain and other elements of nature. It should be understood from the drawings and the description herein that the wires W depicted in FIG. 3 can include a single wire, a group of wires, a wiring harness or bundled wires that provide electric power from the vehicle 10 to electrically powered devices, such as the license plate light L, that are installed on or within the trunk lid 16.

Figure 6:
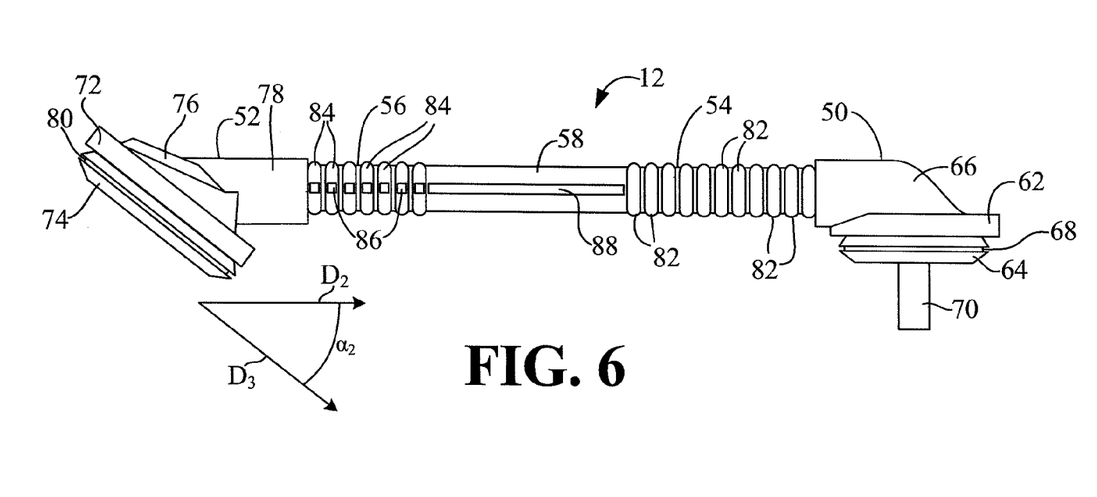
FIG. 6 is a second side elevational view of the grommet in accordance with the first embodiment of the present invention.
Figure 7:
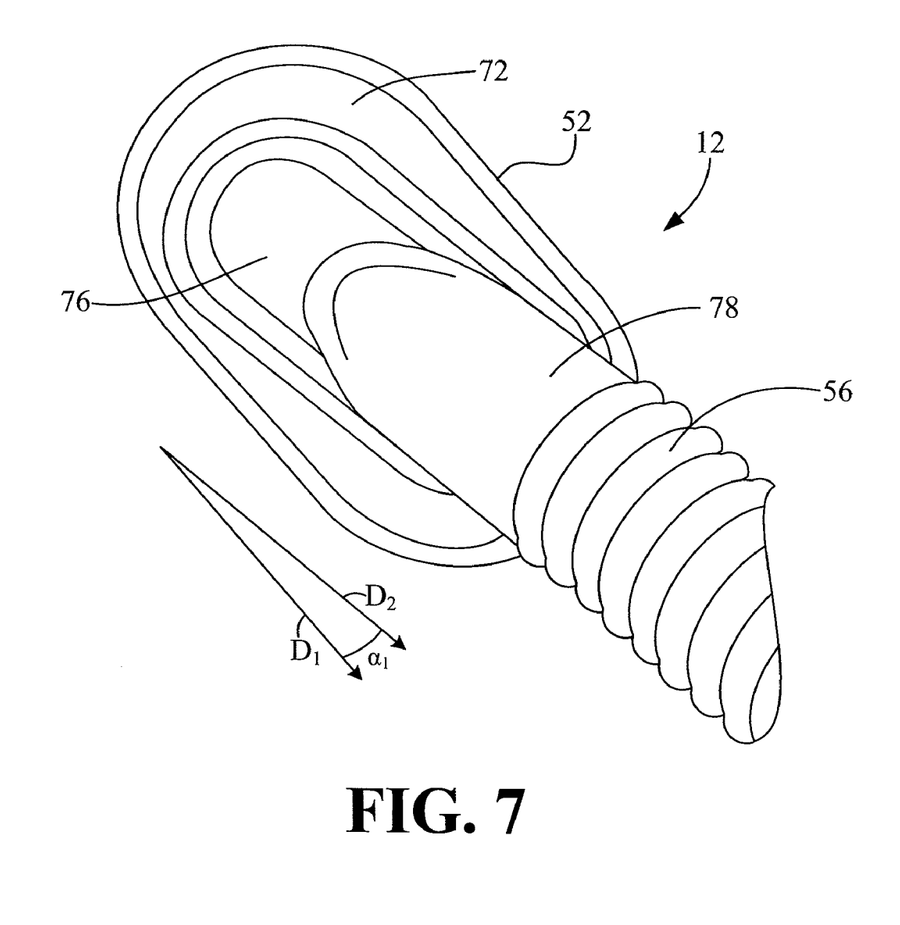
FIG. 7 is an enlarged first side elevational view of grommet showing the closure panel mounting end of the grommet in accordance with the first embodiment of the present invention.
Figure 9:
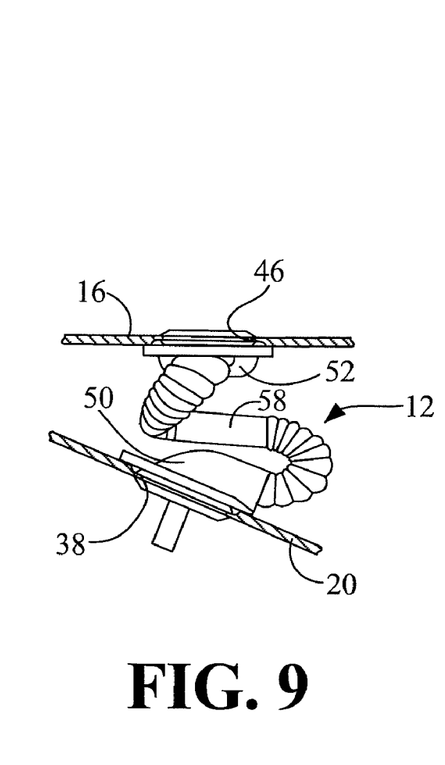
FIG. 9 is a side schematic view showing a representation of a portion of the vehicle, a portion of the trunk lid and the grommet showing the body mounting end of the grommet attached to the vehicle body and the closure panel mounting end of the grommet attached to the trunk lid, with the trunk lid in the closed position and the grommet in a coiled orientation in accordance with the first embodiment of the present invention.
Figure 10:
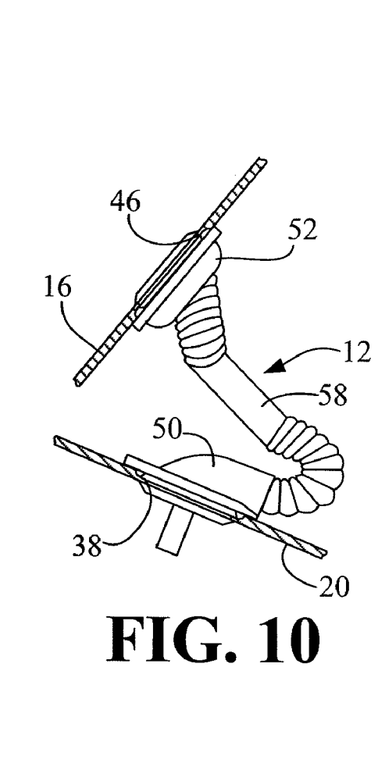
FIG. 10 is another side schematic view similar to FIG. 9, showing the trunk lid in an intermediate position between the open position and the closed position, with the grommet partially uncoiled in accordance with the first embodiment of the present invention.
Figure 11:
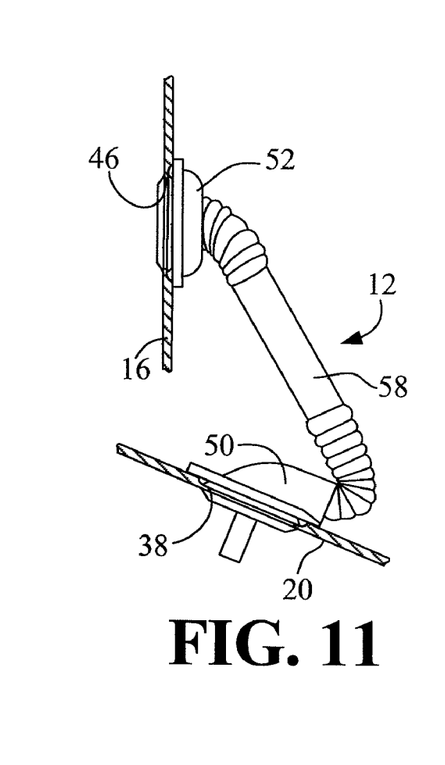
FIG. 11 is yet another side schematic view similar to FIGS. 9 and 10, showing the trunk lid in the open position and with the grommet in an elongated orientation in accordance with the first embodiment of the present invention.

As best shown in FIG. 6, the body mounting end 50 includes a base part 62, an attachment part 64 and a transition part 66. The overall shape of the base part 62 conforms to the overall shape of the first opening 38 in the rear window support portion 20. However, the base part 62 is larger than the first opening 38, as indicated in FIGS. 3, 9, 10 and 11. The attachment part 64 extends from the base part 62 and includes a retention groove 68 and a conduit extension 70. The retention groove 68 extends around the outer periphery of the base part 62. The retention groove 68 is preferably dimensioned to conform to the size and shape of the first opening 38. More specifically, the attachment part 64 installs in the first opening 38. When installed, the edge of the rear window support portion 20 that defines the first opening 38 extend into the retention groove 68 thereby retaining the base part 62 in position relative to the vehicle body 14, as indicated in FIGS. 9, 10 and 11. Since the base part 62 is dimensioned larger than the first opening 38, when the base part 62 of the body mounting end 50 is attached to the rear window support portion 20 (the body panel), the base part 62 overlies the first opening 38, as also indicated in FIGS. 9, 10 and 11.

The transition part 66 is shaped to provide sufficient internal space to gain access to the passageway P within the grommet 12, as shown in FIG. 8. With sufficient internal space within the transition part 66, the wires W can easily be inserted through the passageway P of the grommet 12. The transition part 66 is oriented such that the first flexible section 54 is angled by a 90 degree angle relative to the base part 62, as shown in FIG. 6. In other words, the first flexible section 54 and the conduit extension 70 extend away from one another at a 90 degree angle. The conduit extension 70 is preferably a hollow cylindrically shaped projection extending from the attachment part 64. The conduit extension 70 can be used to further guide the wiring W in a desired direction within the vehicle 10.

It should be understood from the drawings and the description herein, that the attachment part 64 of the body mounting end 50 of the grommet 12 and the first opening 38 can be provided with shapes other than the depicted shapes as long as the overall shape of the attachment part 64 (and the retention groove 68) and the overall shape of the first opening 38 conform to one another. As well, the overall shape of the attachment part 64 and the overall shape of the first opening 38 are further configured to prevent rotation of the body mounting end 50 relative to the first opening 38.

As best shown in FIG. 6, the closure panel mounting end 52 includes a base part 72, an attachment part 74, a transition part 76 and a tubular part 78. The overall shape of the base part 72 conforms to the overall shape of the second opening 46 in the trunk lid 16. However, the base part 72 is larger than the second opening 46, as indicated in FIGS. 9, 10 and 11. The attachment part 74 extends from the base part 72 and includes a retention groove 80. The retention groove 80 extends around the outer periphery of the base part 72. The retention groove 80 is preferably dimensioned to conform to the size and shape of the second opening 46. More specifically, the attachment part 74 installs in the second opening 46. When installed, the edge of the trunk lid 16 that defines the second opening 46 extends into the retention groove 80 thereby retaining the base part 72 in position relative to the vehicle body 14, as indicated in FIGS. 9, 10 and 11. Since the base part 72 is dimensioned larger than the second opening 46, when the base part 72 of the closure panel mounting end 52 is attached to the trunk lid 16 (the closure panel), the base part 72 overlies the second opening 46, as indicated in FIGS. 9-11.

The transition part 76 is shaped to provide sufficient internal space to gain access to the passageway P defined within the grommet 12, as shown in FIG. 8. With sufficient internal space within the transition part 76, the wires W can easily be inserted through the passageway P of the grommet 12.

Figure 5:
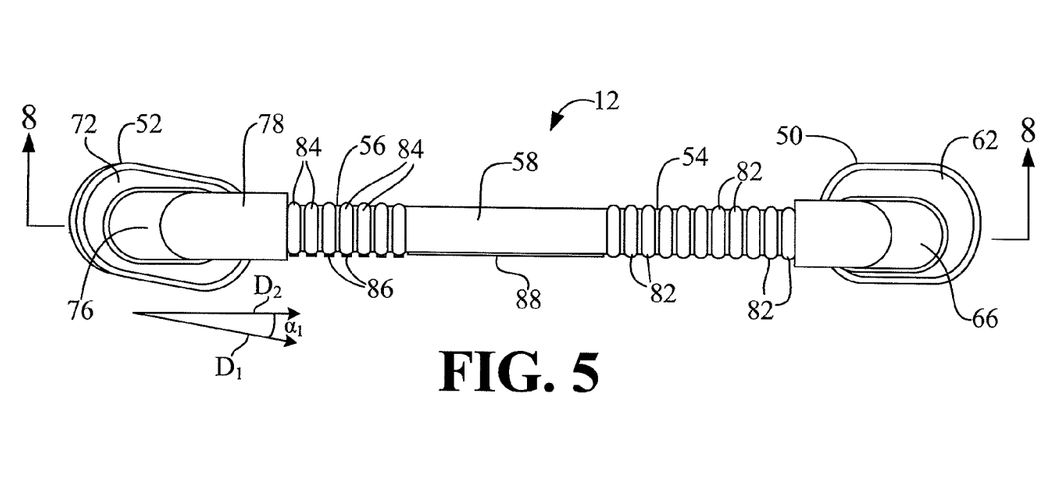
FIG. 5 is a first side elevational view of the grommet in accordance with the first embodiment of the present invention.

The transition part 76 is also oriented such that the tubular part 78 is angularly offset from the base part 72 by angles that that are measurable in two different orthogonal planes corresponding to the views in FIGS. 5 and 6. Specifically, as measured in the plane defined by FIG. 5, the tubular part 78 extends away from the base part 72 by an angle $\alpha_1$ that is preferably approximately 10 degrees. As measured in the plane defined by FIG. 6, the tubular part 78 extends away from the base part 72 by an angle $\alpha_2$ that is preferably approximately 25 degrees. However, it should be understood from the drawings and the description herein that the angle $\alpha_1$ and the angle $\alpha_2$ can be adjusted to meet the geometric requirements of vehicles other that the vehicle 10 depicted in FIG. 1.

In other words, the closure panel mounting end 52 includes the attachment part 74 (an attachment portion) having an oval-like shape that extends in a first direction $D_1$ with the second flexible end 56 extending from the closure panel mounting end 52 in a second direction $D_2$ that is angularly offset from first direction $D_1$, as shown in FIG. 5. However, from the orthogonal view in FIG. 6, it can be seen that the closure panel mounting end 52 includes the attachment part 74 that extends in the third direction $D_3$ and the second flexible end 56 extends from the closure panel mounting end 52 in the second direction $D_2$ that is angularly offset from third direction $D_3$.

It should be understood from the drawings and the description herein that the transition part 66 of the body mounting end 50 can also similarly be provided with angular offsets to meet the geometric requirements of vehicles other that the vehicle 10 depicted in FIG. 1. However, in the depicted embodiment, the transition part 66 is shaped such that at the point where the first flexible section 54 meets the base part 62, the first flexible section 54 extends in a direction generally parallel to the base part 62.

It should be understood from the drawings and the description herein that the attachment part 74 of the closure panel mounting end 52 of the grommet 12 and the second opening 46 can be provided with shapes other than the depicted shapes as long as the overall shape of the attachment part 74 (and the retention groove 80) and the overall shape of the second opening 46 conform to one another. As well, the overall shape of the attachment part 74 and the overall shape of the second opening 46 are further configured to prevent rotation of the closure panel mounting end 52 relative to the second opening 46.

As shown in FIGS. 5, 6 and 8, the first flexible section 54 extends from the transition part 66 of the body mounting end 50. The first flexible section 54 includes a plurality of annular flexible rings 82 about which the first flexible section 54 bends. Specifically, the annular flexible rings 82 resemble annular accordion folds that allow the first flexible section 54 to bend in any direction relative to the body mounting end 50. Each of the annular flexible rings 82 has a curved outer surface when viewed from the side such as in FIGS. 5, 6 and 8. Between each adjacent pair of the annular flexible rings 82 there is a reduced diameter region. Thus, the annular flexible rings 82 allow the first flexible section 54 to stretch (elongate) and return to its shape and length. In the depicted embodiment, the first flexible section 54 includes approximately eleven of the annular flexible rings 82, thereby defining a first group of annular flexible rings. Further, the first flexible section 54 has a first overall length $L_1$, as shown in FIG. 8. Each of the annular flexible rings 82 has a first wall thickness $T_1$. However, it should be understood from the drawings and the description herein that the number of the annular flexible rings 82 can be adjusted to suit the geometric configuration of vehicles other than the vehicle 10 depicted in FIGS. 1 and 2.

The second flexible section 56 extends from the tubular part 78 of the closure panel mounting end 52. The second flexible section 56 includes a plurality of annular flexible rings 84 about which the second flexible section 56 bends. Specifically, the annular flexible rings 84, like the annular flexible rings 82, resemble annular accordion folds that allow the second flexible section 56 to bend in any direction. Each of the annular flexible rings 84 has a curved outer surface. Between each adjacent pair of the annular flexible rings 84 there is a reduced diameter region. Thus, the annular flexible rings 84 allow the second flexible section 56 to stretch (elongate) and return to its shape and length. In the depicted embodiment, the second flexible section 56 includes approximately seven of the annular flexible rings 84, thereby defining a second group of annular flexible rings. Further, the second flexible section 56 has a second overall length $L_2$, as shown in FIG. 8. Each of the annular flexible rings 84 has a second wall thickness $T_2$. Each of the annular flexible rings 84 also includes a protrusion 86, as shown in FIGS. 5 and 6. The protrusions 86 are aligned with one another along the length of the second flexible section 56. However, it should be understood from the drawings and the description herein that the number of the annular flexible rings 84 can be adjusted to suit the geometric configuration of vehicles other than the vehicle 10 depicted in FIGS. 1 and 2.

As shown in FIG. 8, in the first embodiment, the number of the annular flexible rings 82 is greater than the number of annular flexible rings 84. As also shown in FIG. 8, the first overall length $L_1$ of the annular flexible rings 82 is greater than the second overall length $L_2$ of the annular flexible rings 84. Further, in the depicted embodiment, the first wall thickness $T_1$ of the annular flexible rings 82 is preferably the same as the second wall thickness $T_2$. However, it should be understood from the drawings and the description herein that the first wall thickness $T_1$ and the second wall thickness $T_2$ can be altered to change the flexing characteristics of the annular flexible rings 82 and 84 to suit the geometry of a vehicle other than the vehicle 10.

The middle flexible section 58 has an overall cylindric or tubular shape and extends between the first and second flexible sections 54 and 56. As shown in FIG. 2, the middle flexible section 58 extends between the first and second flexible sections 54 and 56 in a free floating configuration with respect to the hinge 32 (the hinge structure). More specifically, the middle flexible section 58 is not attached to the hinge 32 or to any structure of the vehicle 10. The middle flexible section 58 is only connected to the first and second flexible sections 54 and 56. The middle flexible section 58 has a third overall length $L_3$ and a third wall thickness $T_3$. The third overall length $L_3$ is such that the first and third overall lengths $L_1$ and $L_3$ are each greater than the second overall length $L_2$. Further, the third overall length $L_3$ is preferably approximately the same or slightly larger than the first overall length $L_1$. As well, the third wall thickness $T_3$ is greater than either of the first and second wall thicknesses $T_1$ and $T_2$.

The dimensions of the middle flexible section 58 are such that the first and second flexible sections 54 and 56 have a more bendable configuration than the middle flexible section 58. More specifically, the first and second flexible sections 54 and 56 are configured and shaped to bend easily, while the middle flexible section 58 is configured and shaped to resist bending up to a certain point, but is able to bend upon the application of sufficient forces. For instance, the middle flexible section 58 is free of annular flexible rings making bending less likely that bending of the first and second flexible sections 54 and 56. Further, the middle flexible section 58 has a larger wall thicknesses than either of the first and second flexible sections 54 and 56, making the middle flexible section 58 less flexible that the first and second flexible sections 54 and 56. In the depicted embodiment, the first and second wall thicknesses $T_1$ and $T_2$ are approximately 1.5 mm. The third wall thickness $T_3$ is approximately 2.1 mm. However, the thicknesses $T_1$, $T_2$ and $T_3$ can be varied and altered to suit the geometry of a vehicle other than the vehicle 10.

The middle flexible section 58 includes an axially extending rib 88, as shown in FIGS. 5 and 6. The axially extending rib 88 of the middle flexible section 58 and the protrusions 86 of the annular flexible rings 84 of the second flexible section 56 provide an installation orientation of the grommet 12. More specifically, during the installation process, an installer properly orients the grommet 12 for installation within the vehicle 10 by observing the location of axially extending rib 88 and/or the protrusions 86.

Figure 12:
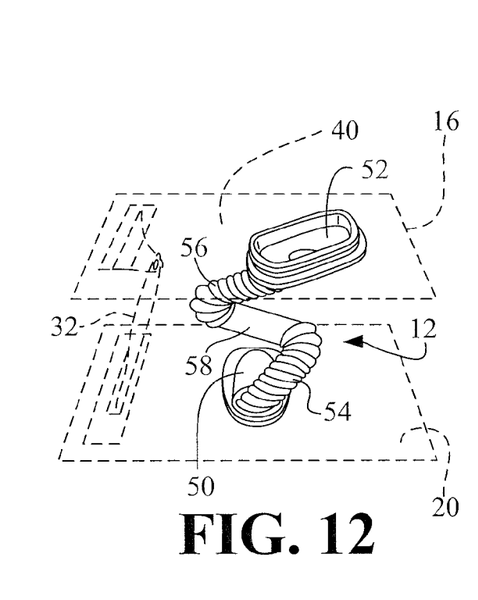
FIG. 12 is a rear schematic view showing a representation of the portion of the vehicle, the portion of the trunk lid and the grommet showing the body mounting end of the grommet attached to the vehicle body and the closure panel mounting end of the grommet attached to the trunk lid, with the trunk lid in the closed position and the grommet in the coiled orientation in accordance with the first embodiment of the present invention.
Figure 13:
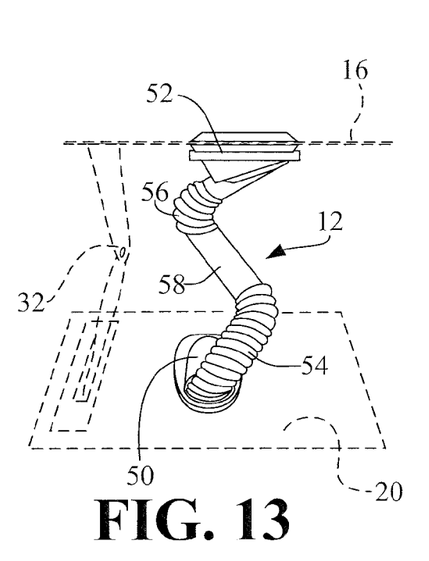
FIG. 13 is another rear schematic view similar to FIG. 12, showing the trunk lid in an intermediate position between the open position and the closed position, with the grommet partially uncoiled in accordance with the first embodiment of the present invention.
Figure 14:
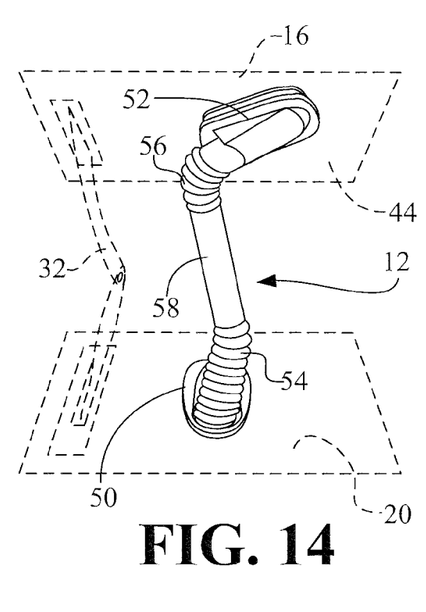
FIG. 14 is yet another rear schematic view similar to FIGS. 12 and 13, showing the trunk lid in the open position and with the grommet in an elongated orientation in accordance with the first embodiment of the present invention.

As shown in FIGS. 9-14, the grommet 12 is specifically configured to move to the coiled orientation (FIGS. 9 and 12) when the trunk lid 16 is moved to the closed position. Further, the grommet 12 is configured to move to the elongated orientation (FIGS. 11 and 14) with the trunk lid moved to the open position. An intermediate orientation of the grommet 12 between the coiled orientation and the elongated orientation is depicted in FIGS. 10 and 13. Throughout the range of movement of the trunk lid 16 between the closed position and the open position, the middle flexible section 58 is configured relative to the first and second flexible sections 54 and 56 such that the grommet 12 (the wiring grommet member) remains laterally spaced from the hinge 32, as best shown in FIGS. 12-14. More specifically, the grommet member 12 is moved to the extended or elongated orientation with the trunk lid 16 (the closure panel) in the open position relative to the rear window support portion 20 (the body panel) and the grommet 12 is moved to the coiled orientation with the trunk lid 16 (the closure panel) in the closed position relative to the rear window support portion 20 (the body panel).

As is shown in FIGS. 12-14, the first flexible section 54, the middle section 58 and the second flexible section 56 are dimensioned and configured such that the middle section 58 pivots from a substantially vertical position (shown in FIG. 12) to a substantially horizontal position (shown in FIG. 14) in a direction substantially parallel to the hinge when the closure panel is moved from the open position to the closed position. As well, the first flexible section 54 and the second flexible section 56 are configured and arranged to bend as the closure panel 40 moves between the open position and the closed position to prevent contact of the grommet member 12 to the hinge structure 32. Further, as shown in FIGS. 12-14, the middle section 58 pivots about one end of the first flexible section 54.

Further, the body mounting end 50 and the closure panel mounting end 52 are spaced apart from one another with the grommet 12 in the extended or elongated orientation, as shown in FIGS. 11 and 14. However, the body mounting end 50 and the closure panel mounting end 52 are positioned adjacent to one another with the grommet 12 in the coiled orientation, as shown in FIGS. 9 and 12.

More importantly, the grommet 12 (the grommet member) bends to the coiled orientation with the trunk lid 16 (the closure panel) in the closed position relative to the rear window support portion 20 (the body panel) without collapsing the wiring passageway P. Therefore, the grommet 12 protects the wires W extending between the rear window support portion 20 of the vehicle body 14 and the trunk lid 16. More specifically, with the grommet 12 installed in the first and second openings 38 and 46 and extending between the first and second openings 38 and 46, the wires W extending through the passageway P are protected against contact with metal body panels thereby preventing wear and degradation of insulation on the wires.

Second Embodiment

Figure 15:
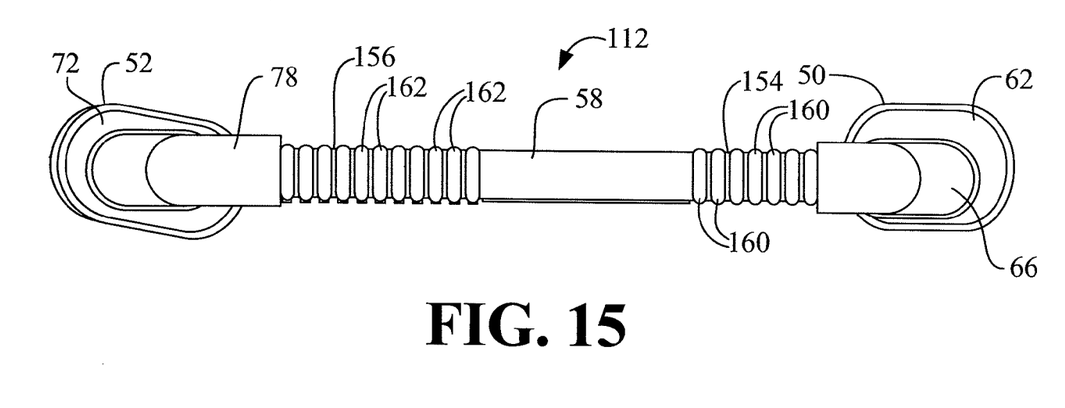
FIG. 15 is a first side elevational view of a grommet in accordance with a second embodiment of the present invention.
Figure 16:
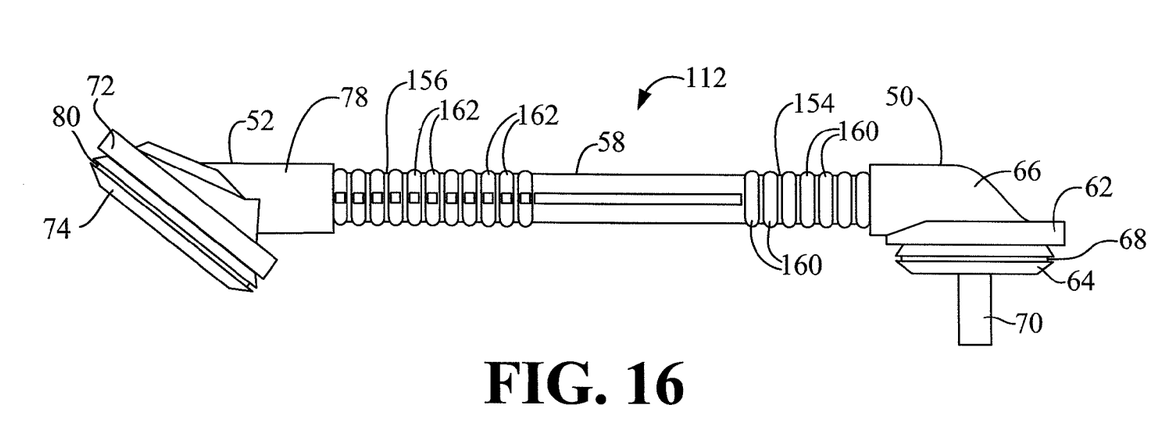
FIG. 16 is a second side elevational view of the grommet in accordance with the second embodiment of the present invention.

Referring now to FIGS. 15 and 16, a grommet 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The grommet 112 includes basically includes the body mounting end 50 (same as in the first embodiment), the closure panel mounting end 52 (same as in the first embodiment), a first flexible section 154, a second flexible section 156 and the middle flexible section 58 (same as in the first embodiment). The grommet 112 further includes the hollow interior that defines the passageway P (not shown in FIGS. 15 and 16).

The first flexible section 154 has a first group of the annular flexible rings 160 and the second flexible section 156 has a second group of the annular flexible rings 162. In the second embodiment, the number of annular flexible rings 160 (the first group) is less in number than the number of the annular flexible rings 162 (the second group). The grommet 112 of the second embodiment is designed to fit the geometry of a vehicle other than the vehicle 10. However, the grommet 112 is configured to move between an extended or elongated orientation and a coiled orientation is a free floating configuration spaced apart from hinges that support a trunk lid.

The various body portions of the vehicle 10 are conventional components that are well known in the art. Since the various body portions of the vehicle 10 are well known in the art, these structures will not be discussed or illustrated in detail herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle grommet assembly comprising:
   a body panel having a first opening;
   a closure panel having a second opening;
   a hinge structure pivotally coupling the body panel to the closure panel for movement of the closure panel between a closed position and an open position; and
   a wiring grommet member attached only to the body panel and the closure panel free from connection to the hinge structure and forming a wiring passageway between the first and second openings, the grommet member including
      a body mounting end attached to the body panel to overlie the first opening;
      a closure panel mounting end attached to the closure panel to overlie the second opening;
      a first flexible section extending from the body mounting end;
      a second flexible section extending from the closure panel mounting end; and
      a middle section extending between the first and second flexible sections in a free floating configuration with respect to the hinge structure, the first flexible section, the middle section and the second flexible section being dimensioned and configured such that the middle section pivots from a substantially vertical position to a substantially horizontal position in a direction substantially parallel to the hinge when the closure panel is moved from the open position to the closed position.

2. The vehicle grommet assembly according to claim 1, wherein
   the closure panel mounting end includes an attachment portion having an oval shape that extends in a first direction with the second flexible end extending from the closure panel mounting end in a second direction that is angularly offset from first direction.

3. The vehicle grommet assembly according to claim 1, wherein
   the middle flexible section includes an axially extending rib that provides an installation orientation of the grommet member.

4. The vehicle grommet assembly according to claim 1, wherein
   the grommet member is in an extended orientation with closure panel in the open position relative to the body panel, and
   the grommet member is in a coiled orientation with the closure panel in the closed position relative to the body panel.

5. The vehicle grommet assembly according to claim 4, wherein
   the grommet member bends to the coiled orientation with the closure panel in the closed position relative to the body panel without collapsing the wiring passageway.

6. The vehicle grommet assembly according to claim 4, wherein
   the body mounting end and the closure panel mounting end are spaced apart from one another with the grommet member in the extended orientation.

7. The vehicle grommet assembly according to claim 4, wherein
   the body mounting end and the closure panel mounting end are positioned adjacent to one another with the grommet member in the coiled orientation.

8. The vehicle grommet assembly according to claim 1, wherein
   the first flexible section and the second flexible section each include a plurality of annular flexible rings about which the first flexible section and the second flexible section bend.

9. The vehicle grommet assembly according to claim 8, wherein
   the middle flexible section being free of annular flexible rings.

10. The vehicle grommet assembly according to claim 1, wherein
    the first flexible section has a first overall length, the second flexible section has a second overall length and the middle flexible section has a third overall length such that the first and third overall lengths are each greater than the second overall length.

11. The vehicle grommet assembly according to claim 10, wherein
    the third overall length is approximately the same or slightly larger than the first overall length.

12. The vehicle grommet assembly according to claim 1, wherein
    the first flexible section has a first wall thickness, the second flexible section has a second wall thickness and the middle flexible section has a third wall thickness such that the third wall thickness is greater than either of the first and second wall thicknesses.

13. The vehicle grommet assembly according to claim 1, wherein
    the body mounting end, the closure panel mounting end, the first flexible section, the second flexible section and the middle flexible section are all made as a single unitary homogeneous member.

14. The vehicle grommet assembly according to claim 1, wherein
    the middle section pivots about one end of the first flexible section.

15. The vehicle grommet assembly according to claim 1, wherein
    the first flexible section and second flexible section are more flexible than the middle section.

16. The vehicle grommet assembly according to claim 15, wherein
    the first flexible section and second flexible section are configured and arranged to bend before the middle section when the closure panel is moved from the open position to the closed position.

17. The vehicle grommet assembly according to claim 15, wherein
    the middle section remains substantially straight as the closure panel is moved from the open position to the closed position.

18. The vehicle grommet assembly according to claim 1, wherein the first flexible section and the second flexible section are configured and arranged to bend as the closure panel moves between the open position and the closed position to prevent contact of the grommet member to the hinge structure.

19. A vehicle grommet assembly comprising:
a body panel having a first opening;
a closure panel having a second opening;
a hinge structure pivotally coupling the body panel to the closure panel for movement of the closure panel between a closed position and an open position; and
a wiring grommet member attached only to the body panel and closure panel free from connection to the hinge structure and forming a wiring passageway between the first and second openings, the grommet member including
a body mounting end attached to the body panel to overlie the first opening;
a closure panel mounting end attached to the closure panel to overlie the second opening;
a first flexible section extending from the body mounting end;
a second flexible section extending from the closure panel mounting end; and
a middle section extending between the first and second flexible sections in a free floating configuration with respect to the hinge structure, the first flexible section and the second flexible section being configured and arranged to bend as the closure panel moves between the open position and the closed position to prevent contact of the grommet member to the hinge structure.

20. The vehicle grommet assembly according to claim 19, wherein
the closure panel mounting end includes an attachment portion having an oval shape that extends in a first direction with the second flexible end extending from the closure panel mounting end in a second direction that is angularly offset from first direction.

21. The vehicle grommet assembly according to claim 19, wherein
the middle flexible section includes an axially extending rib that provides an installation orientation of the grommet member.

22. The vehicle grommet assembly according to claim 19, wherein
the grommet member is in an extended orientation with closure panel in the open position relative to the body panel, and
the grommet member is in a coiled orientation with the closure panel in the closed position relative to the body panel.

23. The vehicle grommet assembly according to claim 22, wherein
the grommet member bends to the coiled orientation with the closure panel in the closed position relative to the body panel without collapsing the wiring passageway.

24. The vehicle grommet assembly according to claim 22, wherein
the body mounting end and the closure panel mounting end are spaced apart from one another with the grommet member in the extended orientation.

25. The vehicle grommet assembly according to claim 22, wherein
the body mounting end and the closure panel mounting end are positioned adjacent to one another with the grommet member in the coiled orientation.

26. The vehicle grommet assembly according to claim 19, wherein
the first flexible section and the second flexible section each include a plurality of annular flexible rings about which the first flexible section and the second flexible section bend.

27. The vehicle grommet assembly according to claim 26, wherein
the middle flexible section being free of annular flexible rings.

28. The vehicle grommet assembly according to claim 19, wherein
the first flexible section has a first overall length, the second flexible section has a second overall length and the middle flexible section has a third overall length such that the first and third overall lengths are each greater than the second overall length.

29. The vehicle grommet assembly according to claim 28, wherein
the first overall length is approximately the same or slightly larger than the second overall length.

30. The vehicle grommet assembly according to claim 19, wherein
the first flexible section has a first wall thickness, the second flexible section has a second wall thickness and the middle flexible section has a third wall thickness such that the third wall thickness is greater than either of the first and second wall thicknesses.

31. The vehicle grommet assembly according to claim 19, wherein
the body mounting end, the closure panel mounting end, the first flexible section, the second flexible section and the middle flexible section are all made as a single unitary homogeneous member.

32. The vehicle grommet assembly according to claim 19, wherein
the middle section pivots from a substantially vertical position to a substantially horizontal position when the closure panel is moved from the open position to the closed position.

33. The vehicle grommet assembly according to claim 19, wherein
the middle section pivots from a substantially vertical position to a substantially horizontal position in a direction parallel to the hinge when the closure panel is moved from the open position to the closed position.

34. The vehicle grommet assembly according to claim 33, wherein
the middle section pivots about one end of the first flexible section.

35. The vehicle grommet assembly according to claim 19, wherein
the first flexible section and second flexible section are more flexible than the middle section.

36. The vehicle grommet assembly according to claim 35, wherein
the first flexible section and second flexible section are configured and arranged to bend before the middle section when the closure panel is moved from the open position to the closed position.

37. The vehicle grommet assembly according to claim 36, wherein
the middle section remains substantially straight while the closure panel is moved from the open position to the closed position.

* * * * *